United States Patent
Boddy et al.

(10) Patent No.: US 6,672,726 B1
(45) Date of Patent: Jan. 6, 2004

(54) EXTENDING AND ROTATING REARVIEW MIRROR ASSEMBLY

(76) Inventors: Ian Boddy, 3447 Lake Crest Ct., Ada, MI (US) 49301; Keith D. Foote, 1219 Ridgebrook Ct., Kentwood, MI (US) 49508

( * ) Notice: Subject to any disclaimer, the term of this patent is extended or adjusted under 35 U.S.C. 154(b) by 650 days.

(21) Appl. No.: 10/019,581

(22) PCT Filed: Jun. 21, 2000

(86) PCT No.: PCT/US00/17072

§ 371 (c)(1),
(2), (4) Date: Dec. 21, 2001

(87) PCT Pub. No.: WO00/78572

PCT Pub. Date: Dec. 28, 2000

Related U.S. Application Data

(60) Provisional application No. 60/139,781, filed on Jun. 21, 1999.

(51) Int. Cl.[7] .................................................. G02B 5/08
(52) U.S. Cl. ........................ 359/841; 359/842; 359/843; 359/872
(58) Field of Search ................................ 359/841, 842, 359/843, 872, 876, 877, 881; 248/480, 476, 549, 900

(56) References Cited

U.S. PATENT DOCUMENTS

| | | | | |
|---|---|---|---|---|
| 5,337,190 A | * | 8/1994 | Kogita et al. | 359/841 |
| 5,546,239 A | | 8/1996 | Lewis | |
| 6,394,616 B1 | * | 5/2002 | Foote et al. | 248/480 |

FOREIGN PATENT DOCUMENTS

| | | |
|---|---|---|
| DE | 2403570 | 8/1974 |
| FR | 2362025 | 3/1978 |

* cited by examiner

*Primary Examiner*—Mohammad Sikder

(57) ABSTRACT

An extending and rotating rearview mirror assembly for use on an automotive vehicle includes a base member (34) for mounting the mirror assembly to the vehicle. An elongated support arm (38) is pivotally mounted to the base member for pivoting the mirror assembly between an operative position and a folded position. The support arm supports a mirror housing (30) having a glass mirror pane (24) therein for providing a rearward reflective view from the vehicle. A coupling assembly (20) interconnects the mirror housing and support arm for sliding mirror housing in a generally horizontal direction with respect to the base member and for rotating the mirror housing with respect to the base member.

15 Claims, 7 Drawing Sheets

EXTENDING AND ROTATING REARVIEW MIRROR ASSEMBLY

This application is a 371 of PCT/US00/17072 filed Jun. 21, 2000 which claims benefit of Ser. No. 60/139,781 filed Jun. 21, 1999.

BACKGROUND OF THE INVENTION

1. Field of the Invention

The present invention is generally related to a rearview mirror assembly for an automotive vehicle, and more particularly, to a rearview mirror assembly which is extendable and rotatable relative to the vehicle.

2. Background of the Invention

Automobiles and trucks typically have primary rearview mirrors mounted on the exterior of the vehicle for providing a field of rearward vision to the vehicle operator. These vehicles are frequently equipped to pull secondary bodies such as trailers, campers, or the like. These secondary bodies are often wider than the vehicle pulling them, thus requiring supplemental mirrors to be affixed to the vehicle body for providing a wider field of rearward vision. The supplemental mirrors extend beyond the primary mirrors to provide the wider field of rearward vision. It is also know to be able to rotate the mirror assembly relative to the vehicle to alter between a horizontal orientation and a vertical orientation and accommodate varying widths and heights of the secondary bodies towed behind the vehicle.

It is desirable to provide a rearview mirror assembly, which may be extended outwardly from the vehicle to provide a wider field of rearward vision to the vehicle operator and eliminate the need for a supplemental mirror. It is also desirable to provide a rearview mirror assembly that is rotatable once extended outwardly from the vehicle to provide a varying horizontal or vertical orientation of the mirror to the vehicle operator.

SUMMARY OF THE INVENTION

The present invention relates to a rearview mirror assembly for a vehicle comprising a mounting assembly for fixedly mounting the mirror assembly to the vehicle in a position to be viewed by an occupant of the vehicle. The mirror assembly includes a mirror body coupled to the mounting assembly. The mirror body includes a mirror housing having an opening therein and a mirror element seated in the opening and coupled to the housing for providing the occupant with a generally rearward reflective view from the vehicle. The mirror assembly further includes a coupling assembly operatively connected between the mounting assembly and the mirror body for translating the mirror body in a generally horizontal direction with respect to the mounting assembly between a first position adjacent to the vehicle and a second position spaced outwardly from the vehicle and for rotating the mirror body with respect to the mounting assembly about an axis extending generally transverse to the horizontal direction between a plurality of rotated positions.

BRIEF DESCRIPTION OF THE DRAWINGS

Other advantages of the present invention will be readily appreciated when the same becomes understood by reference to the following detailed description when considered in connection with the accompanying drawings wherein.

DETAILED DESCRIPTION OF THE PREFERRED EMBODIMENT

Figure 1:
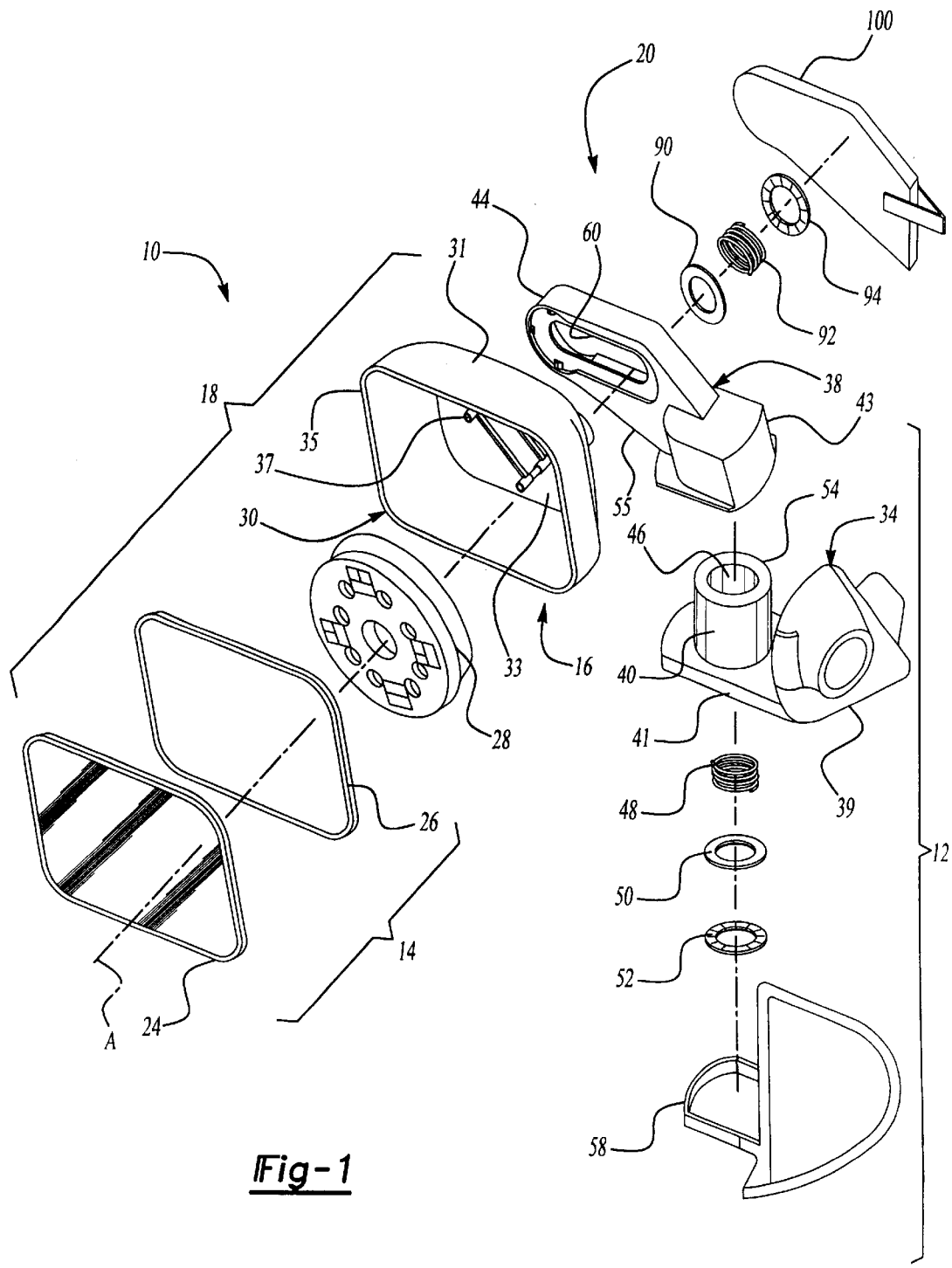
FIG. 1 is an exploded view of a rearview mirror assembly constructed according to the principles of the present invention.

Referring to the Figures, wherein like numbers represent like or corresponding parts throughout the several views, an exploded view of an extending and rotating rearview mirror assembly for use on an automotive vehicle is generally shown at 10 in FIG. 1. The rearview mirror assembly 10 includes a mounting assembly, generally designated 12, constructed and arranged to be mounted to a vehicle (not shown) in a position to be viewed by an occupant of the vehicle, a mirror element 14 for providing the occupant a generally rearward reflected view and a mirror housing assembly 16 constructed and arranged to hold the mirror element 14 in an operative position for providing the occupant with the generally rearward reflected view. The mirror element 14 and the mirror housing assembly 16 define a mirror body, generally designated 18. The mounting assembly 12 mounts the mirror body 18 to the vehicle. That is, the mirror assembly 10 is typically mounted to an exterior door panel of the vehicle as is conventionally known in the art.

The rearview mirror assembly 10 further includes coupling assembly 20 that is constructed and arranged to couple the mirror body 18 to the mounting assembly 12 and (1) to permit the mirror body 18 to translate in a generally horizontal direction with respect to the mounting assembly 12 in response to a force applied to the mirror housing assembly 16 in a generally horizontal direction to controllably move the mirror housing assembly 16 inwardly or outwardly with respect to the vehicle and (2) to permit the mirror body 18 to rotate with respect to the mounting assembly 12 about a transverse axis of rotation extending transversely through an off-center position of the mirror element 14 in response to a torque applied to the mirror body 18 about the axis of rotation. The transverse axis of rotation is shown in phantom lines in FIG. 1 and is labeled "A".

Still referring to FIG. 1, the mirror element 14 includes a conventionally constructed elongated, planar and reflective glass mirror pane 24 mounted in a conventional manner within a glass casing 26 that is preferably made of a suitable molded plastic.

The mirror housing assembly 16 includes a shell-like mirror housing 30, which may be of any conventional construction and is preferably an integral structure made of a suitable molded plastic. The mirror housing 30 includes an outer wall 31 extending from a rear wall 33 to a front peripheral rim 35 and forming a generally rectangular bowl-shaped housing. The peripheral rim 35 defines an opening in the housing 30 for receiving the mirror element 14. The housing 30 further includes a plurality of tubular mounting posts 37 projecting outwardly from the rear wall 33 for receiving and supporting a manual or optional power pack assembly 28 within the housing structure 30 in a conventional manner. The mirror element 14 is pivotally mounted on the power pack assembly 28 in a conventional manner for manual or power-assisted pivotal adjustment of the mirror element 14 with respect to the housing structure 30 as is commonly known to one skilled in the art.

The mounting assembly 12, preferably made of a suitable molded plastic, includes a base member 34 for securing the mirror assembly 10 to the vehicle. The base member 34 includes a triangular-shaped mounting plate 39 having a plurality of apertures passing therethrough for receiving fasteners to secure the mounting plate 39 and base member 34 to the vehicle as conventionally known in the art. The base member 34 further includes a support plate 41 projecting outwardly and generally perpendicular from the mounting plate 39, outboard of the vehicle, for supporting the mirror body 18. A tubular collar 40 projects upwardly from the support plate 41 to a distal end and forms a cylindrical center bore 46 therethrough. A plurality of protruding tabs 54 extends upwardly from the distal end of the collar 40 as will be discussed below.

Figure 2:
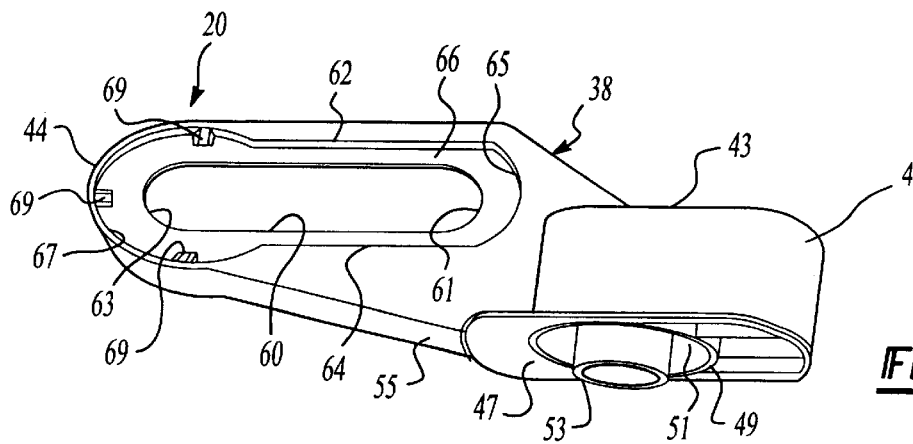
FIG. 2 is an isolated elevational view of a support arm of the rearview mirror assembly.
Figure 3:
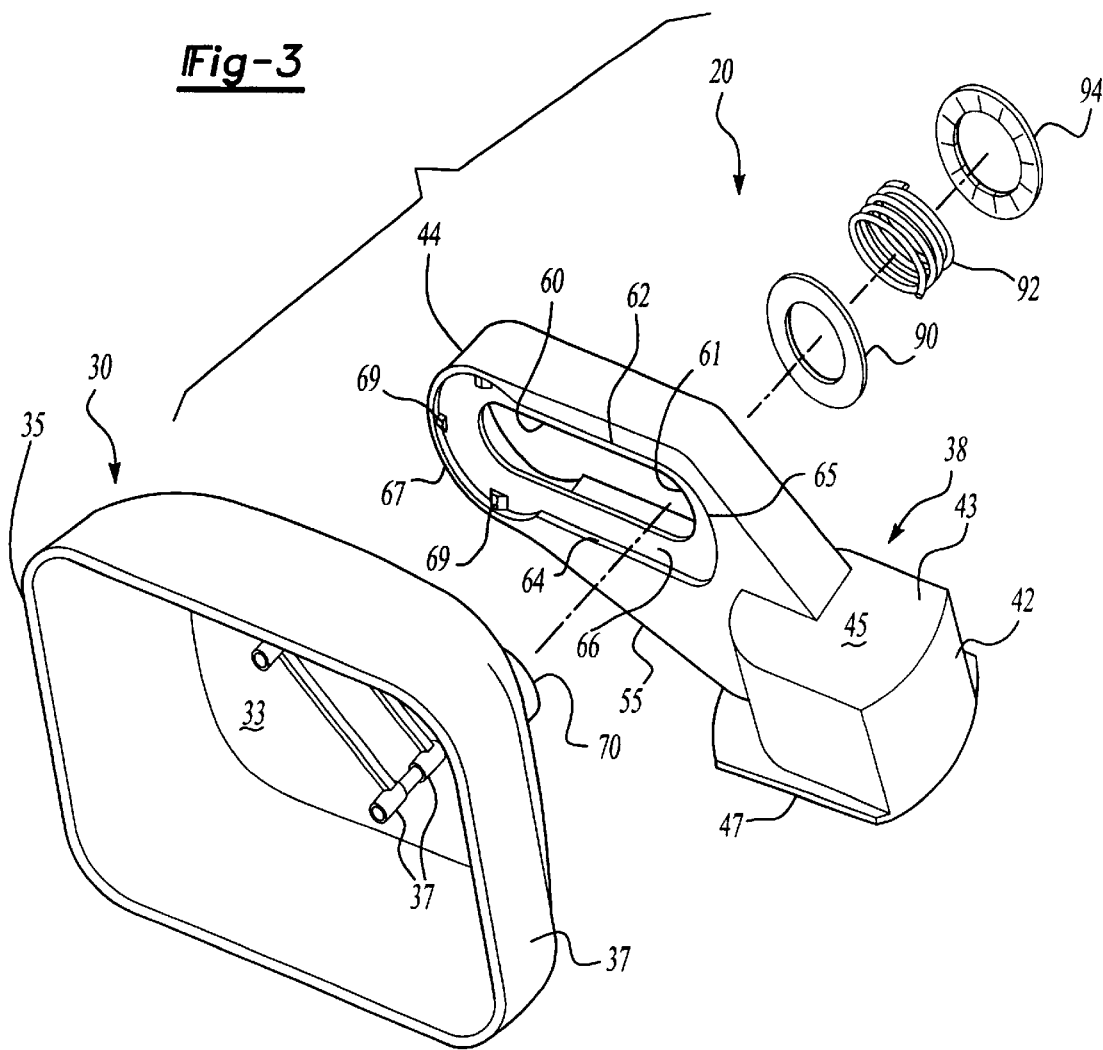
FIG. 3 is an enlarged exploded view of a portion of the rearview mirror assembly showing a housing assembly and the support arm thereof.

Referring to FIGS. 1, 2 and 3, the mounting assembly 12 further includes an elongated support arm 38 that is preferably made of a high strength, lightweight material such as aluminum or other suitable metal or a suitable molded plastic. The support arm 38 extends between a proximal end 42 and a distal end 44. The support arm 38 includes a pivot base 43 adjacent the proximal end 42 and a guide arm 55 extending from the pivot base 43 to the distal end 44. The pivot base 43 has a top surface 45 and bottom surface 47. Referring specifically to FIG. 2, a tubular wall 49 extends between the top surface 45 and the bottom surface 47 to define a cylindrical channel 51 in the pivot base 43 opening through the bottom surface 47. A tubular pivot post 53 is seated in the center of the channel 51 and extends from the top surface 4to the opening in the bottom surface 47. Referring to FIG. 1, in the preferred embodiment, the support arm 38 is pivotally mounted to the base member 34 for pivotal movement between an outwardly extending (in the lateral or cross car direction) operative position and a folded storage position (in a longitudinal or fore-aft vehicle direction). More specifically, the collar 40 is received in the channel 51 to pivotally mount the support arm 38 on the base member 34. The downwardly extending pivot post 53 (best seen in FIG. 2) extends downwardly through the center bore 46 defined by the collar 40. A coil spring 48, washer 50 and push nut 52 are mounted on the end of the pivot post 53 to bias the support arm 38 downwardly into releasably locked engagement with the collar 40 on the base member 34. Specifically, the support arm 38 is releasably held in the operative, or in the folded storage position, by cooperation between the protruding tabs 54 integrally formed on a top edge of the collar 40 and appropriately shaped detents (not shown) integrally formed on the top surface 45 within the channel 51 of the support arm 38. By applying a torsional force of sufficient magnitude to the distal end of the support arm 38, the support arm 38 can be pivoted about an axis defined by the channel 40, forwardly or rearwardly, (i.e. clockwise and counterclockwise direction) from the operative position to and releasably locked in a forwardly folded or rearwardly folded storage position. When the base member 34 is mounted on the vehicle, the base member 34, the spring 48, the washer 50 and the push nut 52 are covered by a base cover member 58.

The mirror body 18 is mounted to the support arm 38 of the mounting assembly 12 by the coupling assembly 20 in a manner described below. The present invention is particularly concerned with the manner in which the mirror body 18 is mounted to the mounting assembly 12 by the coupling assembly 20 for selective generally horizontal movement of the mirror body 18 with respect to mounting assembly 12 and for selective rotational movement therebetween. The structure of the mirror element 14, the mirror housing 30, and the mounting assembly 12 (including the manner in which the base member 34 thereof is secured to the vehicle and the manner in which the support arm 38 thereof is pivotally mounted to the base member 34) can all be conventional and are not the focus of the present invention.

Similarly, the structure and operation of the power pack assembly 28 can also be conventional. More particularly, the power pack assembly can be powered by, for example, an electrical motor or by selectively energizable shape memory alloy wires. The mirror element 14 can also be mounted in the mirror housing 30 for manual adjustment by, for example, a conventional friction cup of the type disclosed in U.S. provisional patent application serial No. 60/105,434 which application is hereby incorporated by reference in its entirety. A suitable power pack that utilizes shape memory alloy wire is disclosed in the above incorporated United States provisional patent application number and a suitable power pack assembly that utilizes an electric motor is disclosed in commonly assigned U.S. Pat. No. 5,467,230 the disclosure of which is hereby incorporated into the present application in its entirety. It will be understood that other known power operated mechanisms may be utilized, as, for example, the more conventional mechanism as disclosed in U.S. Pat. No. 4,915,493, the disclosure of which is hereby incorporated by reference into the present specification. The power operated mechanisms disclosed in U.S. Pat. Nos. 4,678,295 and 4,482,211, both of which are hereby incorporated by reference in their entirety into the present application, can also be used in the present invention.

The preferred construction and arrangement of the coupling assembly 20 is best understood with reference to FIGS. 1–4. The coupling assembly 20 includes an elongated slot 60 that is formed in the support arm 38. Referring specifically to FIGS. 2 and 3, the elongated slot 60 extends between a first arcuate end 61 adjacent to the pivot base 43 and an opposite second arcuate end 63 adjacent to the distal end 44. The slot 60 is bordered by upper and lower upstanding walls 62, 64. The upper and lower upstanding walls 62, 64 are interconnected by an arcuate shaped wall portion 65 adjacent the first arcuate end 61 of the slot 60 and a circular shaped wall portion 67 adjacent to and surrounding the second arcuate end 63 of the slot 60. A planar shelf 66 extends between the edge of the slot and the walls 62, 64, 65 and 67. The circular shaped wall portion 66 has a diameter, or width, that is greater than the width, or distance, between the upper and lower walls 62, 64. The coupling structure 20 further includes three identical releasable rotation preventing elements 69 (best seen in FIGS. 2–3) projecting from the shelf 66, integrally formed in the support arm 38, and preferably spaced ninety degrees apart adjacent the circular wall portion 67 of the support arm 38.

Figure 11:
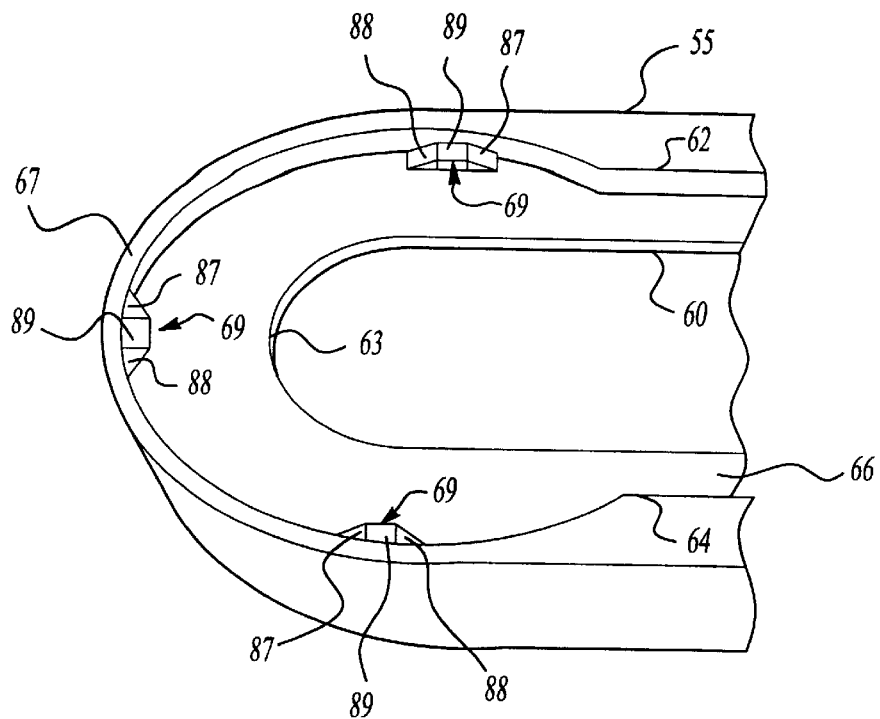
FIG. 11 is an enlarged fragmentary perspective view of a coupling assembly of the support arm.

Referring to FIG. 11, each rotation preventing element 69 includes a forwardly facing ramped surface 87 and a rearwardly facing ramped surface 88 that extend from opposing sides of a central surface 89 of each element 69 (where "forwardly" and "rearwardly" are considered with respect to the fore-aft vehicle direction when the support arm 38 is in its operative position).

Figure 4:
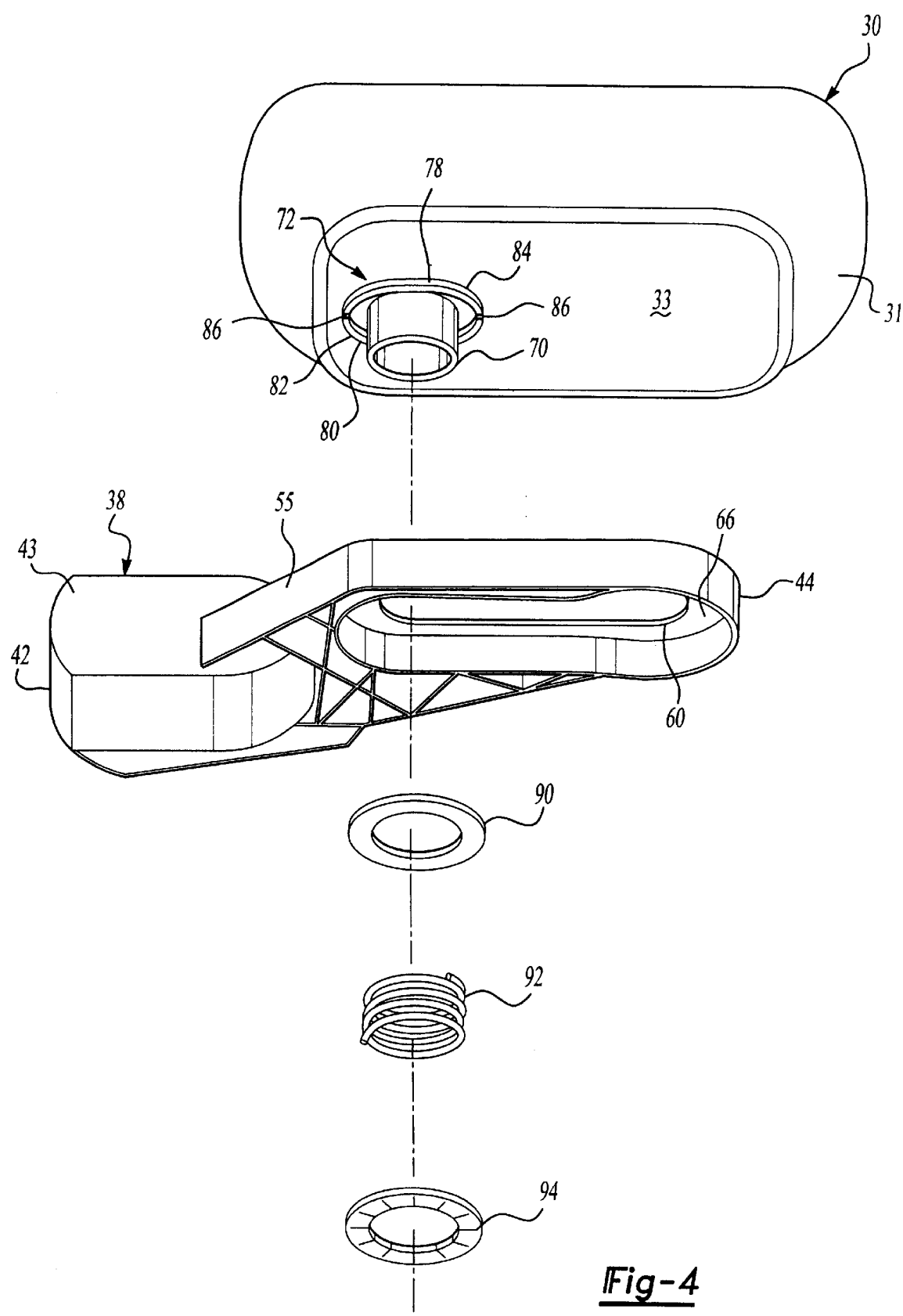
FIG. 4 is an exploded view similar to the view of FIG. 3 but showing an opposite view thereof.
Figure 12:
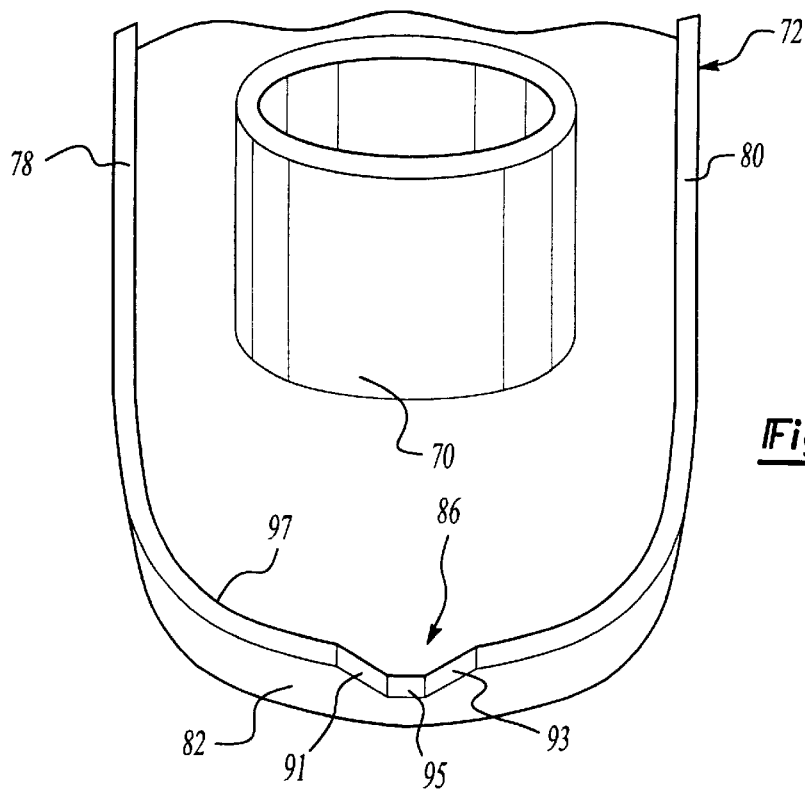
FIG. 12 is an enlarged fragmentary perspective view of the coupling assembly of the mirror body.

As best shown in FIG. 4, the coupling assembly 20 further includes tubular pivot post 70 integrally formed on a forwardly facing (when the mirror assembly 10 is in the operative position) side of the rear wall 33 of the mirror housing 30. The pivot post 70 is formed in an off-center position on the rear wall 33 of the mirror housing 30 and forms the off-center transverse axis A of rotation of the mirror body 18 with respect to the mounting assembly 12. The coupling assembly 20 further includes a guide member 72 surrounding the pivot post 70 and integrally formed on the forwardly facing side of the rear wall 33 of the mirror housing 30. The guide member 72 includes raised upper and lower straight rail portions 78, 80 interconnected at their opposing ends by inner and outer arcuate rail portions 82, 84, respectively. A notch 86 is formed at a central position in each arcuate wall portion 82, 84 of the wall structure 76, and each notch 86 is sized to releasably receive a rotation preventing element 69 therein. Referring to FIG. 12, each notch 86 includes angled or ramped surfaces 91, 93 that extend between a central surface 95 of each notch 86 and a top edge 97 of the rails 82, 84. (It can be understood that the top edge 97 of the rails 82, 84 faces generally in the forward vehicle direction when the support arm 38 is in its operative position.) The angles formed by the ramped surfaces 87, 88 and the angled surfaces 91, 93 are preferably equal, the preferred angular value for each surface 87, 88, 91 and 93 being sixty degrees.

In the preferred embodiment of the mirror assembly 10, each rotation preventing element 69 is a raised detent or bump-like structure that is sized to be received within a selected notch 86. It can be understood that when a sufficiently high torque is applied to the mirror housing assembly 16 about the transverse axis thereof, the angled surfaces 87, 88, 91 and 93 allow the rotation preventing elements 69 to move out of the notches 86 in which they are disposed to allow the mirror housing assembly 16 to rotate with respect to the mounting assembly 12.

Figure 6:
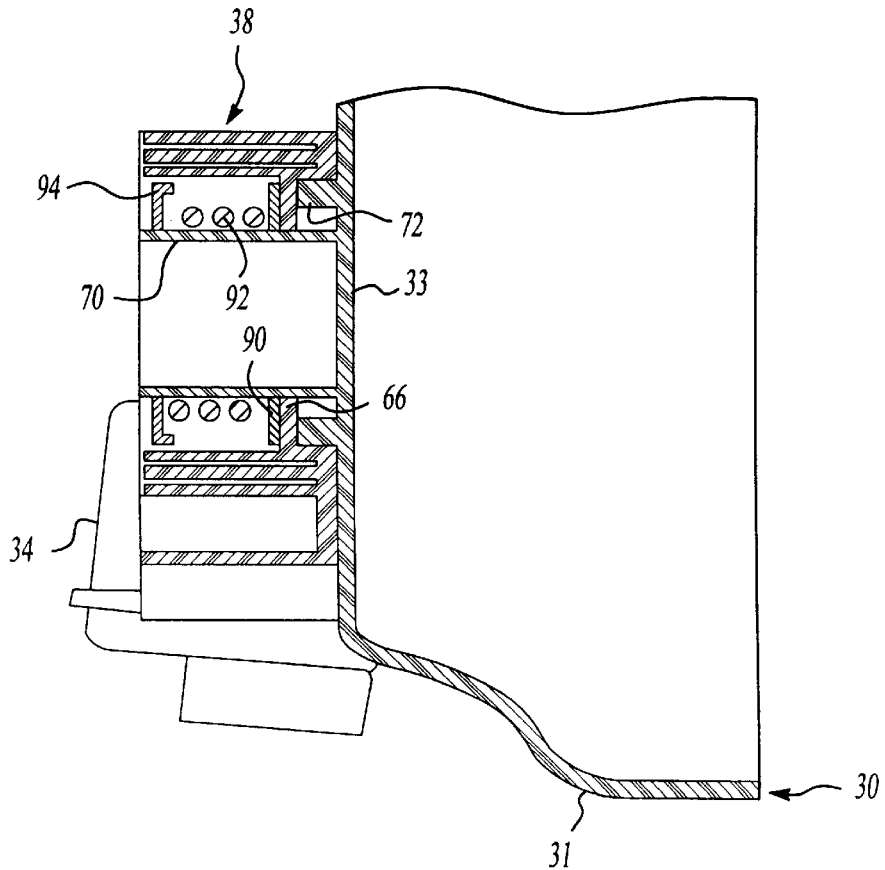
FIG. 6 is a cross-sectional view of the mirror assembly taken through the line 6—6 of FIG. 5 with a power pack assembly and a mirror element removed to more clearly illustrate portions of the invention.

The mirror body 18 is coupled to the mounting assembly 12 by the coupling assembly 20 in a manner best appreciated from FIGS. 4 and 6. The pivot post 70 is sized to be snuggly and slidably received within the elongated slot 60 and is held there by a washer 90, a coil spring 92 and a push nut 94, all of which are of conventional construction. The spring 92 biases the top edge 97 of the rails 78, 80, 82, and 84 to bear against one side of the shelf 66 on the support arm 38 and the washer 90 on the opposite side of the shelf 66. The push nut 94 is secured to the end of the pivot post 70 to slidably retain the post 70 in the slot 60. The front of the support arm 38 is normally covered by an arm cover structure 100, as shown in FIG. 1. More specifically, it can be understood from the cross sectional view of FIG. 6 that the push nut 94 and the coil spring 92 cooperate to bias the mirror housing 30 into frictional engagement with the support arm 38.

The guide member 72 is seated between the upper and lower upstanding walls 62, 64. The biasing force of the coil spring 92 and the abutting engagement between the upper and lower horizontally extending wall portions 62, 64 and the upper and lower straight rail portions 78, 80 (on the support arm 38 and mirror housing 30, respectively) prevents unintended movement of the mirror body 18 with respect to the support arm 38 when the guide member 72 is positioned between the wall portions 62, 64 and adjacent the first arcuate end 61 of the elongated slot 60 during normal use of the mirror assembly 10. It can be appreciated from FIG. 5 that during normal use of the mirror assembly 10 when the guide member 72 is at the first arcuate end 61 of the elongated slot 60, the upper and lower rails 78, 80 are in frictional engagement and abutting relation with the upper and lower horizontal walls 62, 64 integrally formed on the support arm 38 to prevent relative rotational movement therebetween. The engagement between the guide member 72 and the wall portions 62, 64 allows horizontal translational movement of the mirror body 18 with respect to the mounting assembly 12 to reposition the mirror body 18 with respect to the mounting assembly 12 when the user applies a manual horizontal force of sufficient magnitude.

Figure 7:
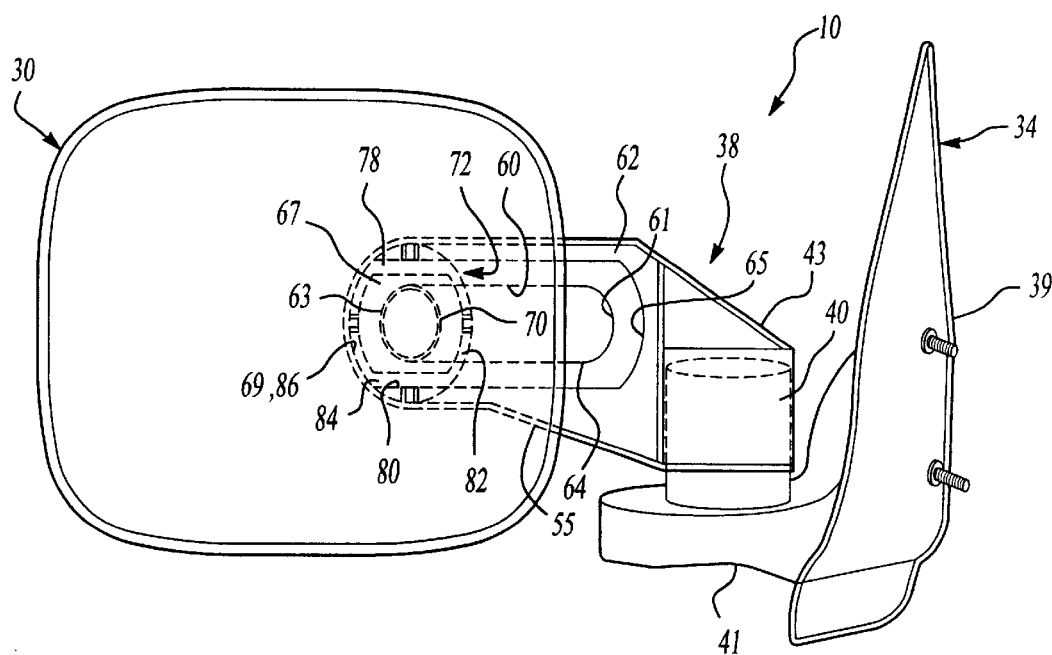
FIG. 7 is a view of the rearview mirror assembly similar to the view of FIG. 5, but showing the mirror body in a fully outwardly extended position.

It can be appreciated from FIG. 7 that the when the guide member 72 of the mirror body 18 has been translated horizontally to the second arcuate end 63 of the elongated slot 60, the upper and lower straight rails 78, 80 of the guide member 72 are not in abutting relation with the upper and lower horizontal walls 62, 64 on the support arm 38 and the arcuate rails 82, 84 of the guide member 72 are positioned to frictionally engage the circular wall portion 67 of the support arm 38 to allow rotation of the mirror body 18 with respect to the support arm 38 of the mounting assembly 12 when a manual force of sufficient magnitude is applied. The releasable rotation preventing elements 69 are positioned to engage at least one of the notches 86 in the guide member 72 to hold the mirror body 18 in any of a number of predefined angular, or rotation, positions with respect to the mounting assembly 12. The spring 92 urges each of the rotation preventing element 69 into releasable engagement with the notches 86 in which it is releasably disposed.

Figure 5:
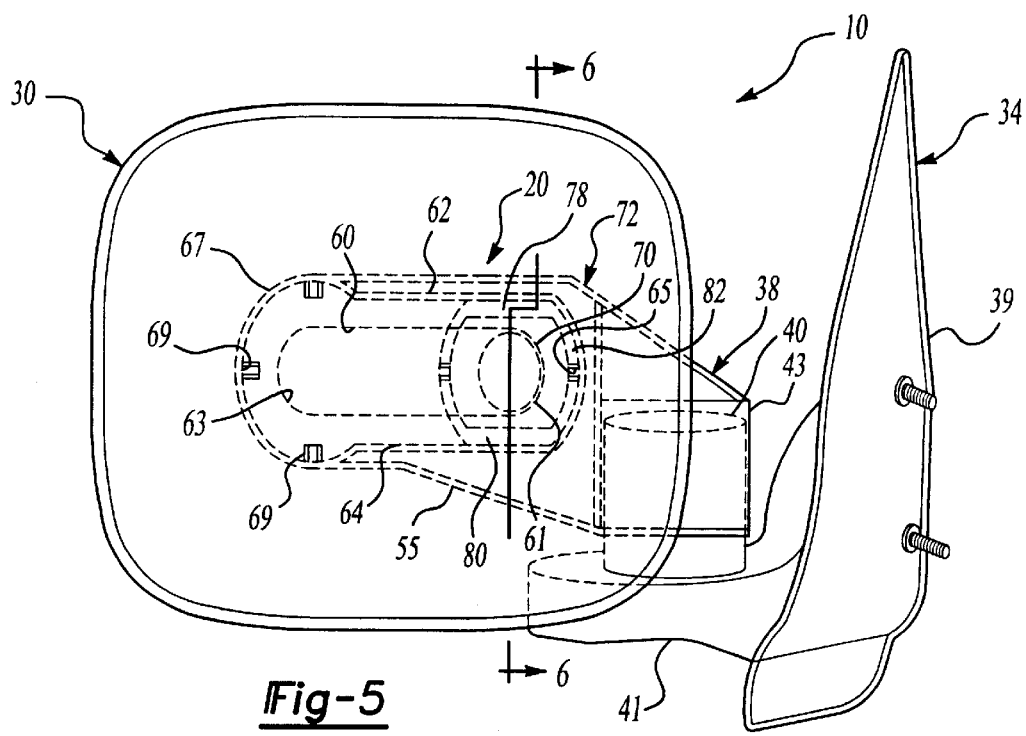
FIG. 5 is an isolated view of the rearview mirror assembly showing a mirror body thereof in a fully inwardly position.

The operation of the rearview mirror assembly 10 can best be understood with reference to FIGS. 5, and 7–10. Referring to FIG. 5, the mirror body 18 is positioned inwardly with respect to the mounting assembly 12 and shows the elongated mirror element 14 in a generally horizontally extending orientation. It can be appreciated that in this position, the mirror element 14 provides the driver with a rear view that is generally directed rearwardly and outwardly of the vehicle so that the driver can see generally rearwardly of the vehicle. The slidable, abutting engagement between the upper and lower straight rails 78, 80 of the coupling structure 20 and the upper and lower horizontally extending wall portions 62, 64 of the coupling structure 20 permits the mirror body 18 to translate in a generally horizontal direction with respect to the mounting assembly 12 when the driver applies a generally horizontally directed force on the mirror housing assembly 16 to allow the driver to controllably move the mirror housing assembly 16 outwardly with respect to the vehicle toward the second arcuate end 63 of the elongated slot 60, but prevents rotational movement of the mirror body 18 with respect to mounting assembly 12 until the mirror body 18 has moved to the second arcuate end 63 of the elongated slot 60. The abutting engagement between the rails 78, 80 and the wall portions 62, 64 stabilizes the mirror body 18 to help prevent movement therebetween.

It can be understood that when the walls 62, 64, 78, 80 are in abutting engagement, the mirror body 18 is prevented from rotating with respect to the mounting assembly 12. When the driver has moved the mirror body 18 fully outwardly to the position shown in FIG. 7, the circular wall 67 on the support arm 38 and arcuate rails 82, 84 of the guide member 72 are in abutting engagement and two of the releasable rotation preventing elements 22 are received within the notches 86 formed in the guide member 72 to prevent relative rotation between the mirror body 18 and the support arm 38 of the mounting assembly 12. It can be appreciated from FIG. 7 that the rails 78, 80 on the mirror housing 30 have moved out of abutting engagement with the walls 62, 64 on the support arm 38 to allow relative rotation between the mirror body 18 and mounting assembly 12.

It can also be appreciated from FIG. 7 that the elongated mirror element 14 is disposed in a generally horizontally extending orientation to provide the driver with a relatively wide rearview in the horizontal direction. Some drivers prefer a rearview that has a relatively wide view in the vertical direction, especially when driving relatively tall vehicles such as trucks or vans or when towing tall trailers. When the mirror body 18 is in the extended position relative to the support arm 38 of the mounting assembly 12, the guide member 72 and the inner and outer arcuate rails 82, 84 cooperate with the circular wall portion 67 of the support arm 38, respectively, to provide an off-center, transversely extending axis of rotation for the mirror body 18 to allow the driver to rotate the mirror body 18 about the pivot post 70 with respect to the mounting assembly 12 by applying a torsional force manually to the mirror body 18 about the transversely extending axis of rotation.

Figure 8:
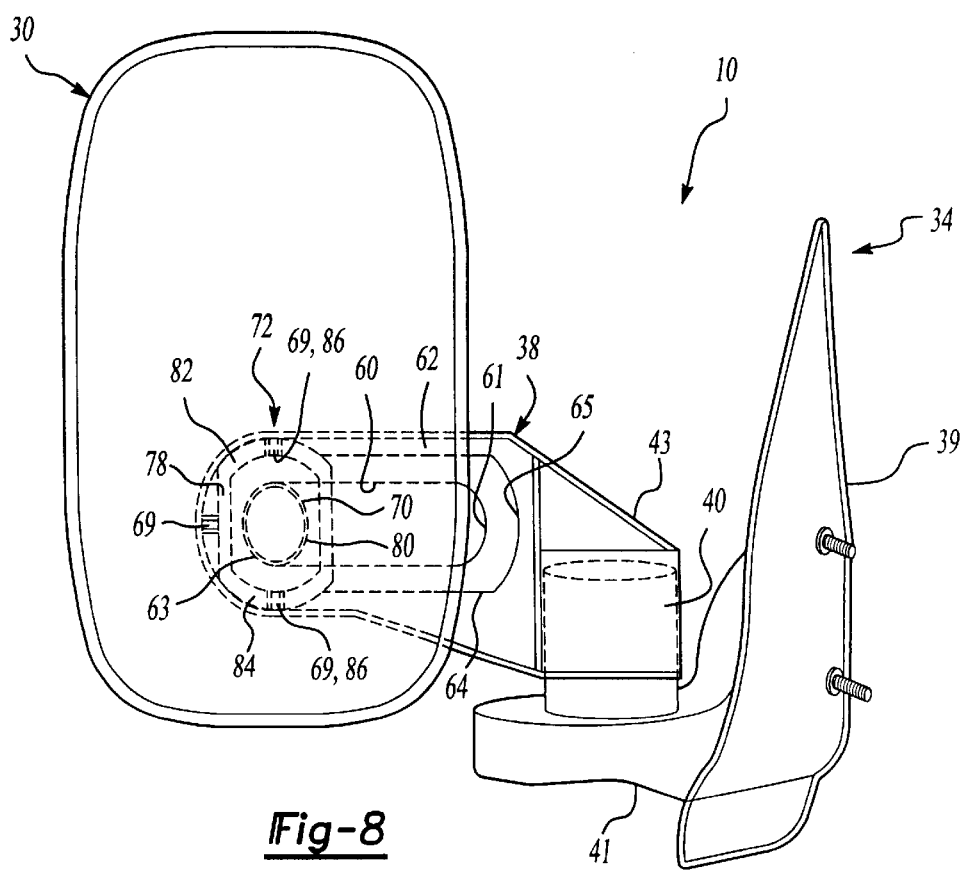
FIG. 8 is a view of the rearview mirror assembly similar to the view of FIG. 7, but showing the mirror body rotated generally vertically upwardly from a mounting assembly thereof.
Figure 9:
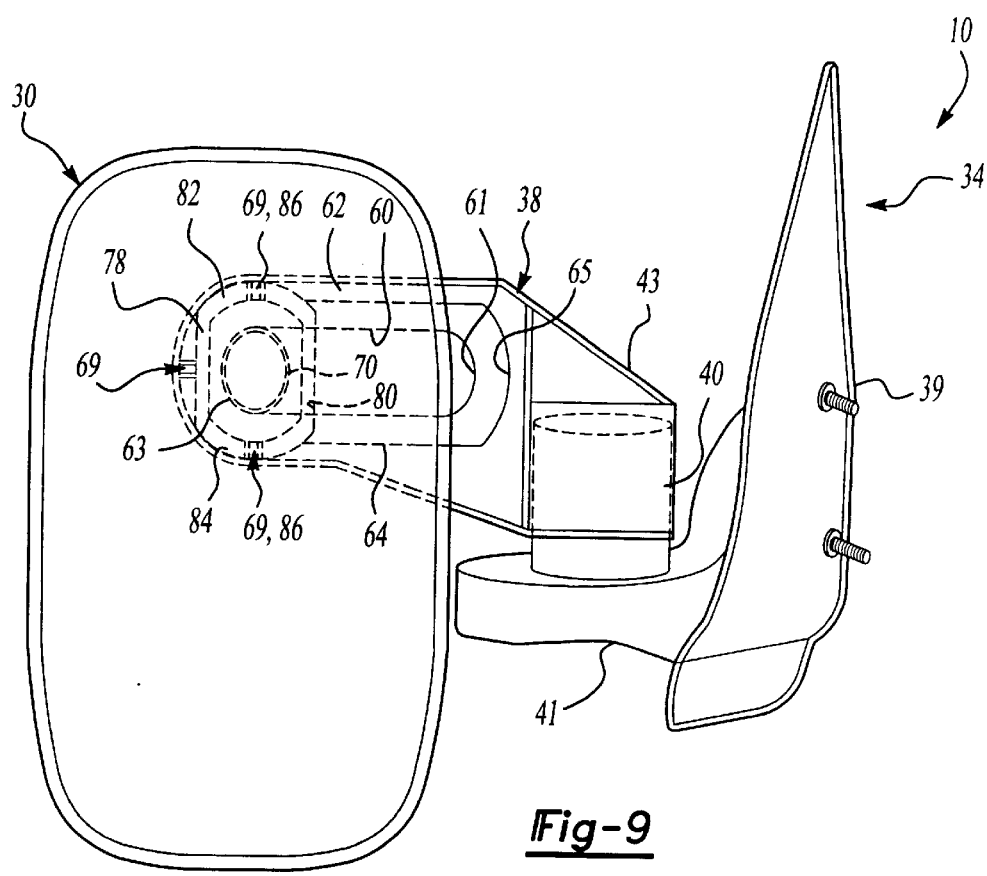
FIG. 9 is a view of the rearview mirror assembly similar to the view of FIG. 8, but showing the mirror body rotated generally vertically downwardly from the mounting assembly.

This rotation of the mirror body 18 allows the driver to reposition the mirror element 14 so that the elongated extent thereof extends generally vertically as shown, for example, in FIGS. 8 or 9. More specifically, it can be appreciated that when the mirror body 18 is in the position shown and FIG. 7, the driver can rotate the mirror body 18 clockwise or counter clockwise (from the point of view shown in FIGS. 7–9) so that when the mirror element 14 is generally vertical, it extends generally upwardly from the support arm 38 (as shown in FIG. 8) or generally downwardly therefrom (as shown in FIG. 9), respectively. It can be appreciated from FIGS. 7–9, that in the exemplary embodiment of the rearview mirror assembly 10 shown therein, the releasable rotation preventing elements 22 of the coupling structure 20 predefine four angular positions (three of which are shown in FIGS. 7–9) radially spaced 90 degrees apart in which the mirror body can be releasably secured with respect to the mounting assembly. It is within the scope of the intention, however, to provide releasable rotation preventing elements 22 in positions appropriate to releasably bold the mirror body 18 in any number of angular positions with respect to the support arm 38, including positions other than essentially horizontal and essentially vertical.

It can be understood from FIG. 6 that when the driver applies a torque of sufficient magnitude to the mirror body 18 about the off-center axis of rotation thereof, the coils spring 92 is compressed and the mirror body 18 moves generally outwardly (in the transverse direction) from the support arm 38 to allow the releasable rotation preventing elements 22 to move out of the notches 86 in which they are normally held. The driver continues applying the torsional force on the mirror body 18 until each notch 86 moves respectively into releasable engagement with the next adjacent releasable rotation preventing element 22 to hold the mirror body 18 in the next predefined mirror body position.

It can be understood that each time the driver repositions the mirror body 18 with respect to the support arm 38 of the mounting assembly 12, it may be necessary for the driver to pivotally reposition the mirror element 14 with respect to the mirror housing 30 to accommodate the new position of the mirror body 18 to provide the desired rearview. The pivotal repositioning of the mirror element 14 with respect to the mirror housing 30 is accomplished in an entirely conventional manner and will not be considered in detail and the present application. When a manually adjusted friction cup is provided to mount the mirror element 14 in the mirror housing 30, the driver manually manipulates the mirror element 14. When a power pack assembly is provided, the driver manipulates a conventionally constructed multi-position switch assembly (not shown) mounted within the interior of the vehicle to reposition the mirror element 14. It can be appreciated that a plurality of wires (not shown) are provided between the power pack assembly 28 and the multi-position switch assembly to selectively energize and control the power pack assembly.

It will be understood, however, that a typical multi-position switch assembly for pivotally repositioning a power operated mirror within a shell-like housing structure includes a switch member that has multiple predefined switch positions which correspond to specific, intended pivotal movements of the mirror. For example, to pivot a mirror upwardly within a shell-like housing structure, the driver typically moves the multi-position switch member upwardly (or forwardly) and to pivot to the mirror generally outwardly, the driver typically moves of the switch member outwardly (in the cross car direction) and so on. This makes the manipulations of the switch member required to move the mirror element intuitive. It can be appreciated, however, that when the mirror body 18 is in the positions shown in FIGS. 7–9, movements of the switch member would ordinarily not correspond as aforesaid in all three mirror body 18 positions and would in fact be different for each rotational position of the mirror body 18 with respect to the mounting assembly 12. It is therefore preferable that when a power pack assembly 28 is included in the rearview mirror assembly 10, two microswitches 100, 102 are mounted within the support arm 38 of the mounting assembly 12 ninety degrees apart and are operatively engaged with the guide member 72 of the housing structure 30.

Figure 10:
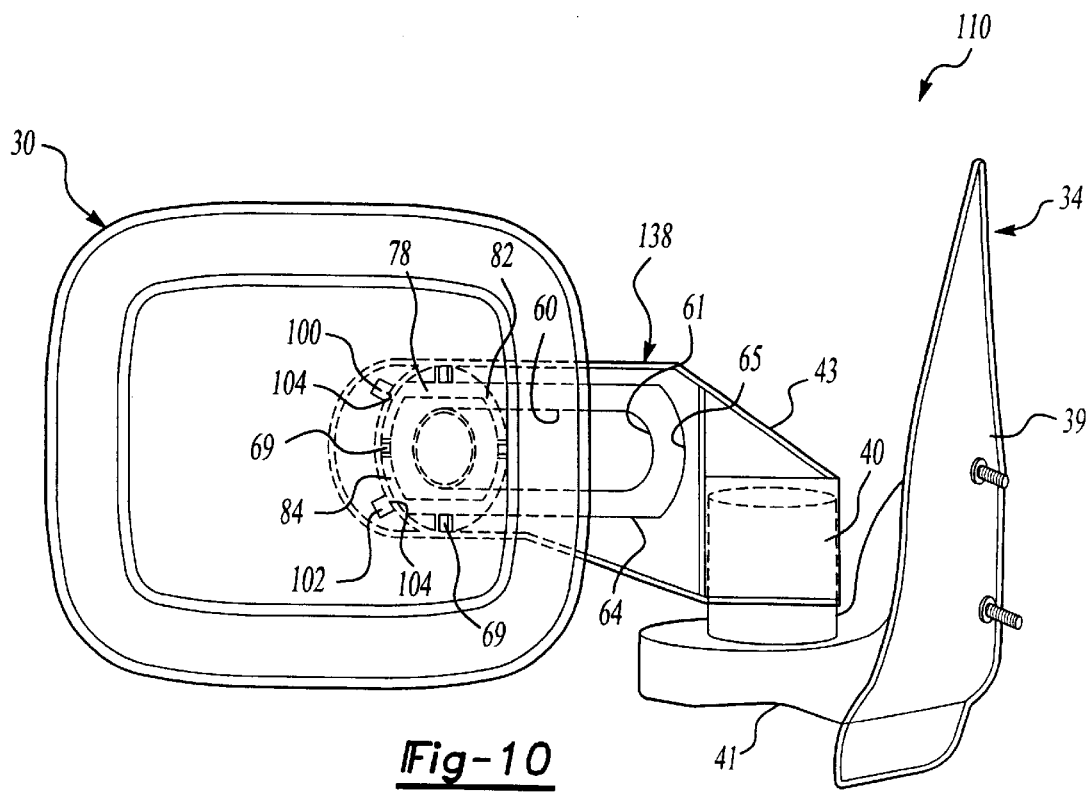
FIG. 10 is a view of a second embodiment of a rearview mirror assembly similar to the view of the first embodiment shown in FIG. 7 except showing in addition a plurality of optional microswitches mounted in the support arm.

An exemplary embodiment of a rearview mirror assembly that includes micro switches is designated 110 and shown in FIG. 10. Structures of assembly 110 that are similar to structures on assembly 10 are given identical reference numbers and are not described in further detail. When the micro switches 100, 102 are included in a rearview mirror assembly 110, switch portions 104 thereof extending through respective apertures (not shown) formed in the support arm 38 and selectively releasably engage two switch receiving apertures (not shown) formed in the guide member 72 of the housing structure 30. The two switch receiving apertures are disposed ninety degrees apart and, because there are two switches, there are for possible switch conditions. An exemplary logic table for these four possible micro switch 100, 102 conditions is as follows:

| Mirror Position | Micro switch 100 | Micro switch 102 |
| --- | --- | --- |
| 0 degrees rotation (FIG. 7) | On | On |
| 90 degrees rotation clockwise (FIG. 8) | On | Off |
| 180 degrees rotation (not shown) | Off | Off |
| 90 degrees rotation counter clockwise (FIG. 9) | Off | On |

Because there are four distinguishable switch conditions or positions for the microswitches 100, 102, an appropriately programmed microprocessor would be able to determine the rotational orientation of the mirror body 18 relative to the support arm 38 of the mounting assembly 12 in ninety degree increments. The microprocessor could be programmed to translate given switch movements into consistent pivotal movements of the mirror element 14 with respect to the housing structure 30 so that the user would have a consistent switch interface. Thus, a given movement of the multi-position switch member would correspond to a given mirror element 14 movement regardless of the relative position of the mirror body 18 with respect to the mounting assembly 12. Only the On-On micro switch 100, 102 position is shown in FIG. 10; other micro switch positions would be as indicated in the above table.

It is understood that the rearview mirror assembly 10 shown in the drawings and described herein is exemplary only and not intended to limit the scope of the invention. It is within the scope of the present invention, for example, to provide a mirror assembly in which the mirror body is rotatable with respect to the mounting assembly in a plurality of horizontal positions of the mirror body with respect to the mounting assembly so that rotational repositioning of the mirror body is not restricted to the case in which the mirror body is translated fully horizontally outwardly from the vehicle.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A rearview mirror assembly for a vehicle comprising:
   a mounting assembly for fixedly mounting said mirror assembly to the vehicle in a position to be viewed by an occupant of the vehicle;
   a mirror body coupled to said mounting assembly, said mirror body including a mirror housing having an opening therein and a mirror element seated in said opening and coupled to said housing for providing the occupant with a generally rearward reflective view from the vehicle;
   a coupling assembly operatively connected between said mounting assembly and said mirror body for translating said mirror body in a generally horizontal direction with respect to said mounting assembly between a first position adjacent to the vehicle and a second position spaced outwardly from the vehicle and for rotating said mirror body with respect to said mounting assembly about an axis extending generally transverse to said horizontal direction between a plurality of rotated positions.

2. A rearview mirror assembly as set forth in claim 1 wherein said mounting assembly includes an elongated support arm extending between a proximal end and a distal end for mounting said mirror body thereto.

3. A rearview mirror assembly as set forth in claim 2 wherein said coupling assembly includes an elongated slot formed in said support arm and extending between a first arcuate end and second arcuate end between said proximal and distal ends of said support arm.

4. A rearview mirror assembly as set forth in claim 3 wherein said coupling assembly includes a tubular pivot post projecting from said mirror housing and slidably received within said elongated slot for lateral movement between said first and second arcuate ends.

5. A rearview mirror assembly as set forth in claim 4 wherein said elongated slot is bordered by upper and lower upstanding walls interconnected by an arcuate shaped wall portion adjacent said first arcuate end and a circular shaped wall portion adjacent to and surrounding said second arcuate end of said slot.

6. A rearview mirror assembly as set forth in claim 5 further including a planar shelf extending between the peripheral edge defining said slot and each of said upper and lower upstanding walls, said arcuate shaped wall portion and said circular shaped wall portion.

7. A rearview mirror assembly as set forth in claim 6 further including a plurality of equally spaced apart releasable rotation preventing elements projecting from said shelf adjacent said circular shaped wall portion.

8. A rearview mirror assembly as set forth in claim 7 wherein said mirror housing includes a rear wall opposite said opening and said coupling member includes a guide member projecting from said rear wall and surrounding said pivot post for mating alignment between said upper and lower walls adjacent said slot.

9. A rearview mirror assembly as set forth in claim 8 wherein said guide member includes raised upper and lower straight rail portions interconnected at their opposing ends by inner and out arcuate rail portions.

10. A rearview mirror assembly as set forth in claim 9 wherein said guide member includes a notch formed at a central position in each arcuate wall portion thereof to releasably receive one of said rotation preventing elements therein to define a rotated position of said mirror body.

11. A rearview mirror assembly as set forth in claim 10 wherein each of said rotation preventing elements includes a forwardly facing ramp surface and a rearwardly facing ramped surface extending from opposing sides of a central surface for cooperation with said notch in said guide member to define said rotated position.

12. A rearview mirror assembly as set forth in claim 11 wherein each notch includes opposing ramped surface extending between a central surface an a top edge of said respective adjacent rail portion for mating with said ramp surfaces of said rotation preventing elements.

13. A rearview mirror assembly as set forth in claim 12 further including a spring bias element seated around said pivot post between said shelf and a retaining nut opposite said guide member for slidably securing said mirror housing to said support arm and guide member against said shelf.

14. A rearview mirror assembly as set forth in claim 13 further including a base member for operatively supporting said support arm and mirror housing and adapted to mount said mirror assembly to the vehicle.

15. A rearview mirror assembly as set forth in claim 14 wherein said base member includes a tubular collar projecting upwardly from a support plate for rotatably receiving and supporting said support arm thereon and for providing rotation movement of said support arm and mirror housing relative to said vehicle.

* * * * *

UNITED STATES PATENT AND TRADEMARK OFFICE
CERTIFICATE OF CORRECTION

PATENT NO. : 6,672,726 B1 Page 1 of 1
DATED : January 6, 2004
INVENTOR(S) : Boddy et al.

It is certified that error appears in the above-identified patent and that said Letters Patent is hereby corrected as shown below:

Column 10,
Line 29, "out" should be -- outer --.
Line 49, add -- said -- before "guide member".

Signed and Sealed this

Eighteenth Day of May, 2004

JON W. DUDAS
*Acting Director of the United States Patent and Trademark Office*